(12) United States Patent
Huggins et al.

(10) Patent No.: US 8,778,457 B2
(45) Date of Patent: Jul. 15, 2014

(54) HYDROPHOBIZING OF FIBROUS MATERIALS WITH POLYORGANOSILOXANES

(75) Inventors: John Huggins, Leverkusen (DE); Roland Wagner, Bonn (DE); Karl-Heinz Sockel, Leverkusen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 0 days.

(21) Appl. No.: 13/699,051

(22) PCT Filed: May 27, 2011

(86) PCT No.: PCT/EP2011/058720
§ 371 (c)(1),
(2), (4) Date: Jan. 22, 2013

(87) PCT Pub. No.: WO2011/147959
PCT Pub. Date: Dec. 1, 2011

(65) Prior Publication Data
US 2013/0130040 A1    May 23, 2013

(30) Foreign Application Priority Data

May 28, 2010  (EP) .................................... 10164322

(51) Int. Cl.
| | | |
|---|---|---|
| B05D 7/12 | (2006.01) |
| C09D 183/04 | (2006.01) |
| C08G 77/16 | (2006.01) |
| C09D 183/06 | (2006.01) |
| D06M 15/643 | (2006.01) |
| D21H 21/16 | (2006.01) |
| C08L 83/06 | (2006.01) |
| C14C 9/00 | (2006.01) |
| D06M 15/647 | (2006.01) |
| D21H 19/32 | (2006.01) |
| D21H 17/59 | (2006.01) |

(52) U.S. Cl.
CPC .............. *C09D 183/04* (2013.01); *D21H 19/32* (2013.01); *C08G 77/16* (2013.01); *C09D 183/06* (2013.01); *D06M 15/643* (2013.01); *D21H 21/16* (2013.01); *C08L 83/06* (2013.01); *C14C 9/00* (2013.01); *D06M 15/6436* (2013.01); *D21H 17/59* (2013.01); *D06M 2200/12* (2013.01); *D06M 15/647* (2013.01); *D06M 15/6433* (2013.01)
USPC ..... 427/387; 427/389; 427/389.9; 427/393.4; 427/394; 524/588; 528/10; 528/25

(58) Field of Classification Search
None
See application file for complete search history.

(56) References Cited

U.S. PATENT DOCUMENTS

| | | |
|---|---|---|
| 3,381,019 A | 4/1968 | Morehouse |
| 3,538,137 A | 11/1970 | Viventi |
| 6,093,222 A | 7/2000 | Grabowski et al. |
| 2004/0103483 A1* | 6/2004 | Delplancke et al. ......... 8/115.51 |
| 2012/0289649 A1* | 11/2012 | Wagner et al. ............... 524/588 |

FOREIGN PATENT DOCUMENTS

| | | |
|---|---|---|
| EP | 0356963 A2 | 3/1990 |
| WO | WO 2009/003862 * | 1/2009 |

OTHER PUBLICATIONS

Abstracts, RN list, machine translation and original document of JP 2009-155272, Jul. 2009.*
International Search Report for corresponding PCT/EP2011/058720 mailed Nov. 29, 2011, three pages.
International Preliminary Report On Patentability for corresponding PCT/EP2011/058720 mailed Dec. 13, 2012, six pages.

* cited by examiner

*Primary Examiner* — Erma Cameron
(74) *Attorney, Agent, or Firm* — Rankin, Hill & Clark LLP

(57) ABSTRACT

The present invention relates on the use of 1,3-dihydroxy-alkyl functionalized polyorganosiloxanes in compositions for the treatment of materials having a fibrous structure, such as leather, furs, textiles and paper. The invention further relates to a process for treating fibrous materials with waterproofing.

20 Claims, No Drawings

HYDROPHOBIZING OF FIBROUS MATERIALS WITH POLYORGANOSILOXANES

The present invention relates to waterproofing agents based on specific polyorganosiloxanes with polar functional groups for the treatment of materials having a fibrous structure, in particular natural fibers, such as found in leather, furs, textiles and paper. The invention further relates to a process for treating fibrous materials with waterproofing agents containing specific polyorganosiloxanes with polar functional groups. Owing to the durable fixation of polyorganosiloxanes with specific polar functional groups to natural fibers, the inventive waterproofing agents provide long-lasting hydrophobic treatment desired in uses such a shoewear, clothing or furnishings.

The treatment of leather, furs, textiles and other fibrous materials to impart hydrophobicity, often referred to as waterproofing, is common. In particular waterproofing leather is desirable in the manufacture of high quality footwear, clothing or furnishings. Also waterproofing textiles and fabrics is common in outerwear. A durable waterproofing is difficult to achieve and a number of approaches to this problem have been proposed.

U.S. Pat. No. 2,964,425 describes the use of organic sarcosines in leather waterproofing.

GB 1005475 discloses a fat liquoring salt composition of a hydroxylated polydimethylsiloxanes, aminoalkyltrialkoxysilane, glacial acetic acid and isopropyl alcohol in the treatment of making the leather soft and hydrophobic.

The inventors of WO 95/30028 propose the use of organofunctional polyorganosiloxanes having OH, SH, NH groups for leather treatment. They disclose compositions of polydimethylsiloxanes and C18-alkyl-polyethers having carboxylic groups neutralized with sodium hydroxide.

WO 03/64707 discloses compositions comprising polycarboxylic acids, carboxy functional polysiloxanes, N-olelysarcosine, oleylether carboxylic acids and others.

EP213480 discloses compositions of emulsions for leather waterproofing wherein siloxanes have mercapto functional groups and emulsifiers are selected from the group of alkylacyl-aminoacids and its salts. The organofunctional siloxanes claimed comprise amino, sulfido and carboxy functional groups.

EP 324345 describes leather waterproofing with emulsions of siloxanes having organofunctional carboxy groups, whereby the carboxy groups are neutralized by an appropriate nitrogen base.

EP638128 describes leather waterproofing with siloxanes with organofunctional sulfosuccinate groups.

EP745141 describes leather waterproofing with emulsions of siloxanes with organofunctional carboxy groups, whereby the carboxy groups are separated from the siloxane backbone by a C5-C25 organic spacer group.

EP757108 describes leather waterproofing with polyorganosiloxanes in combination with specific acrylic copolymers. Described are siloxanes with organofunctional amino, thio or carboxy groups and MQ resins.

EP 938590 describes leather waterproofing with carboxyamid-functional polyorganosiloxanes.

EP1087021 describes leather waterproofing with an organic oil or wax, a carboxy functional siloxane and an anionic surfactant.

EP1108765 describes leather waterproofing with emulsions of specific organofunctional siloxanes with carboxy groups.

EP1470258 describes leather waterproofing with an organic oil, an organofunctional siloxane, an anionic surfactant and an organic acid.

EP 1416057 describes Chromium-free tanning and fatliquoring of leather with organofunctional siloxanes, including carboxyfunctional siloxanes.

EP 0356963 discloses siloxane compounds terminated with the diol at one end thereof. These siloxane compounds are used as comonomers where the hydroxy groups react for example with isocyanate or carboxylic groups to obtain siloxane modified polyurethanes or polyesters that might be used for example to improve surface characteristics like water repellency of certain substrates. As the terminal diol group reacts in the copolymerisation reaction, it is no longer contained in the final product. Thus there is no clue in this document to use siloxane compounds as such in the treatment of fibrous substrates.

U.S. Pat. No. 3,538,137 discloses hydrolyzable organosilanes derived from silicon hydrogen compounds and trimethylol alkane derivatives. These silanes are taught to be useful as glassfibre sizing agents. However, there is no clue to the use of polysiloxanes in the treatment of leather etc.

DE 1283238 discloses as a method for the manufacture of the hydroxyalkyloxyalkylsiloxanes useful as stabiliser of polyurethane foams.

EP 101 0748 discloses diesel fuel defoamer compositions, comprising mixtures of silicons, including hydrosilation reaction product of SiH silicon and trimethylol propane monoallylether.

None of these proposed waterproofing agents meet all of the requirements for durable waterproofing of fibrous materials. For example waterproofing leather need allow for uniform dyeing, little loss of firmness, and good water vapor permeability. Leather used in footwear needs to exhibit dynamic water resistance as tested by the method of Maeser. Many of the proposed agents leave an oily film on the leather surface or lead to significant loss of firmness or a too soft hand. In particular many of the proposed agents form emulsions with marginal stability, often leading to a non-uniform treatment of the substrate and other problems in the application of these materials. It is particularly desirable in the field that waterproofing agents be stable to heat and freezing. Also many processes for treatment of fibrous materials involve aqueous treatment baths or floats that have a pH of 4 to 7, in particular a pH of 5 to 6. The preferred waterproofing agent should be stable to dilution in excess water in this pH range.

It was surprisingly found that polyorganosiloxanes with 1,3-dihydroxyalkyl functional groups on Si—C-bonded hydrocarbon radicals are especially effective waterproofing agents for fibers, pulps, leather and a wide variety of other fibrous materials. In particular, it was found that these polyorganosiloxanes could be formulated to give emulsions that are highly stable to heat, freezing and dilution in water at pH 5 to 6.

In another aspect of the present invention it was found that combining the inventive polyorganosiloxane with 1,3-dihydroxyalkyl functional groups with even minor proportions of polyorganosiloxanes with specific polar functional groups can produce hydrophobic articles with highly durable waterproofing in fiber, pulp, or leather treatment processes.

Thus the present invention provides a novel use of ac polyorganosiloxane a) comprising at least one 1,3-dihydroxy alkyl moiety in the treatment of fibrous substrates. In a preferred embodiment said polyorganosiloxane a) is used in an aqueous composition, in particular, in an aqueous emulsion.

The fibrous substrates are preferably selected from leather, furs or leather substitutes, for example, natural or artificial leather, alcantara (ultrasuede).

By using polyorganosiloxane a) a hydrophobic treatment of the fibrous substrate is performed.

The polyorganosiloxane a) may have the formula:

$$[M_a D_b T_c Q_d]_e \quad (I)$$

wherein
$M = R_3 SiO_{1/2}$,
$D = R_2 SiO_{2/2}$,
$T = RSO_{3/2}$,
$Q = SiO_{4/2}$,
with
a=1-10
b=0-1000
c=0-1
d=0-1
e=1-10
wherein
R=is an organic group,
with the requirement that R comprises at least one group $R^1$ comprising an 1,3-dihydroxy alkyl moiety.

The 1,3-dihydroxy alkyl moiety is in particular a group shown by of the formula:

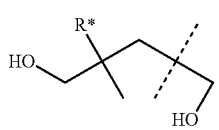

wherein the dotted line is the free valence of the group to the rest of molecule, and wherein the group R* may represent one or more organic substituent groups, preferably with up to 20 carbon atoms, and optionally comprising one or more hetero atoms, attached to any carbon atom of said 1,3-dihydroxy alkyl moiety.

The 1,3-dihydroxy alkyl moiety according to the invention usually does not include alkyl moieties having an additional hydroxyl substituent at the β-carbon atom, that is, at the carbon atom between the 1,3-position, i.e. having an 1,2,3-trihydroxyalkyl moiety.

In a preferred embodiment the polysiloxane compounds according to the invention comprise siloxy structural elements selected from the following formulas:

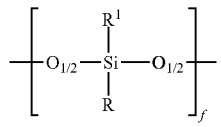

wherein R=$C_1$ to $C_{22}$-alkyl, fluoroalkyl or aryl, and $R^1$ is an organic group bound via a carbon atom to the silicon atom, comprising an 1,3-dihydroxy alkyl moiety,
f=0-600,

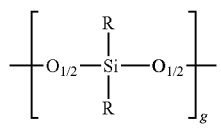

wherein the groups R is as defined above, and
g=0-700,

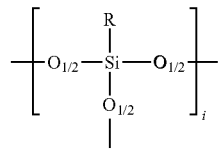

wherein R is as defined above, and
h=0-10,

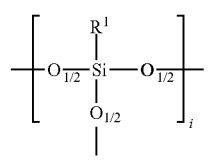

wherein $R^1$ is as defined above, and
i=0-10,

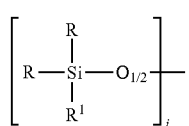

wherein R and $R^1$ are as defined above, and
j=0-30,

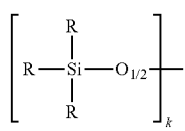

wherein R is as defined above, and
k=0-30,

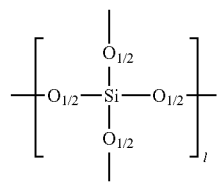

wherein l=0-10,
f+g+h+i+j+k+l=12 to 1100.

In preferred embodiments l=i=h=0, that is, preferred are polysiloxanes having linear polydiorganosiloxane backbones formed of D units.

In a further preferred embodiment the polyorganosiloxane a) is selected from polyorganosiloxanes having pendant and/or terminal 1,3-dihydroxy alkyl moieties. This means that the 1,3-dihydroxy alkyl moieties are attached either to the terminal units M or chain-forming units D and T, preferably D.

Preferably the polyorganosiloxane a) is selected from linear polyorganosiloxanes having terminal 1,3-dihydroxy alkyl moieties.

The 1,3-dihydroxy alkyl moiety is preferably a group of the formula:

-A-(B)$_v$, wherein v=1 or 2, preferably 1, A is a di- or trivalent organic residue having up to 30, preferably up to 20 carbon atoms bound to a silicon atom of the polyorganosiloxane moiety via a carbon atom, B is an optionally substituted 1,3-dihydroxypropanyl moiety bound to the group A having the above indicated formula:

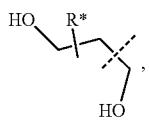

wherein R* is as defined above.

R* includes preferably an optionally substituted alkyl group with 1 to 6 carbon atoms, wherein optional substituents include in particular 1 to 3 three groups, selected for example from hydroxy, for example R* is methyl, ethyl, hydroxymethyl etc.

The di- or trivalent, preferably trivalent organic residue having up to 20 carbon atoms A includes linear, branched and/or cyclic, saturated, unsaturated and/or aromatic organic residues which may comprise one or more hetero atoms, selected from N, O, S, and P. Examples of such linking groups A include saturated hydrocarbon groups, optionally comprising one to three ether groups (—O—) for example —CH$_2$O—CH$_2$—, —CH$_2$CH$_2$CH$_2$—, —CH$_2$CH$_2$CH$_2$CH$_2$—, —CH$_2$CH$_2$CH$_2$—O—CH$_2$—, —CH$_2$CH$_2$CH$_2$NH—CH$_2$—, or —CH$_2$CH$_2$CH$_2$—O—CH$_2$CH(OH)CH$_2$—NH—CH$_2$—.

Preferred 1,3-dialkyl moieties B include for example:

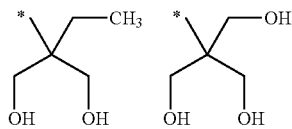

wherein * indicates the bond to the linking group A.

Preferred linking groups A include for example:

wherein ** indicates the bond to the silicone atom of the polyorganosiloxane backbone and * denotes the bond to the 1,3-dihydroxy alkyl moiety B.

A preferred polyorganosiloxane a) has the formula:

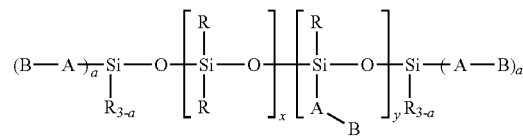

wherein a is 0 to 3, preferably 0 or 1,
x is 0 to 1000, preferably 10 to 1000,
y is 0 to 100,
x+y is 0 to 1100, preferably 10 to 1000,
a+y is ≥1,
A and B are as defined above,
R is an organic group having up to 25 carbon atoms.

In a preferred embodiment polyorganosiloxane a) is of the general formula:

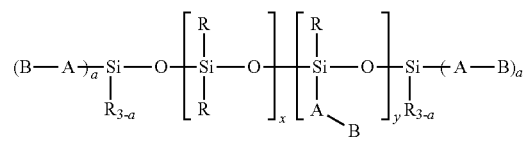

wherein a is 0 or 1,
x is 10 to 1000
y is 0 to 100,
x+y is 10 to 1100
a+y is ≥1,
A is a divalent optionally substituted organic radical with up to 20 carbon atoms that can contain one or more groups such as, optionally substituted aromatic moieties, such as optionally alkoxy and/or hydroxy substituted phenylene, —O—, —NR'—, —CH$_2$—CH(OH)—CH$_2$—, —C(O)NR'—, —O—C(O)NR'—, —O(O)—, —C(O)O—, and the like, and R' is hydrogen, an alkyl or alkylaryl group with up to 18 carbon atoms,
B radical is any organic radical with two or more hydroxy groups wherein at least two such hydroxy groups are positioned 1,3 to another, as explained above,
R is an organic group having up to 25 carbon atoms.

Preferred examples of -A-(B)$_v$ are:
—CH$_2$CH$_2$CH$_2$O—CH$_2$C(CH$_2$CH$_3$)(CH$_2$OH)$_2$,
—CH$_2$CH$_2$CH$_2$O—CH$_2$C(CH$_2$CH$_3$)(CH$_2$OH)(CH$_2$OCH$_2$C(CH$_2$CH$_3$)(CH$_2$OH)$_2$),
—CH$_2$CH$_2$CH$_2$O—CH$_2$C(CH$_3$)(CH$_2$OH)$_2$,
—CH$_2$CH$_2$CH$_2$O—CH$_2$C(CH$_3$)(CH$_2$OH)(CH$_2$OCH$_2$C(CH$_3$)(CH$_2$OH)$_2$),
—CH$_2$CH$_2$CH$_2$O—CH$_2$C(CH$_2$OH)$_3$,
—CH$_2$CH$_2$CH$_2$O—CH$_2$C(CH$_2$OH)$_2$(CH$_2$OCH$_2$C(CH$_2$OH)$_3$),
—CH$_2$CH$_2$CH$_2$O—CH$_2$CH(OH)CH$_2$NHCH$_2$C(CH$_2$OH)$_3$,
—CH$_2$CH$_2$(CH$_2$)$_n$C(CH$_2$OH)$_3$, n=1-18,

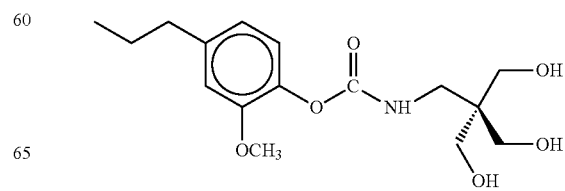

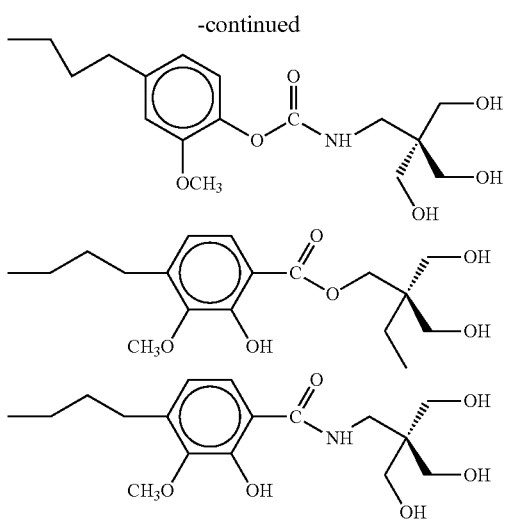

and the like.

The general synthesis of such polyhydroxy functional polyorganosiloxanes is described for example in U.S. Pat. No. 3,381,019 and U.S. Pat. No. 4,640,940.

Especially preferred are polyorganosiloxanes a) with the formula:

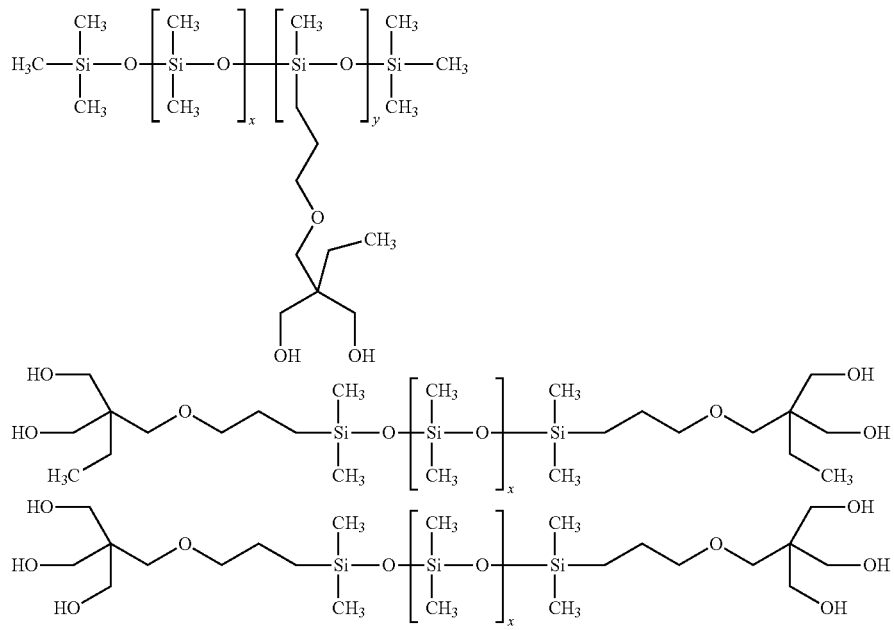

wherein x and y are as defined above.

Preferred are compositions for the treatment of fibrous materials comprising a) at least one polyorganosiloxane with 1,3-dihydroxyalkyl functional groups as defined above, b) at least one polyorganosiloxane—different from polyorganosiloxane a)—having one or more organic groups bound to the polyorganosiloxane backbone via an Si—C-bond, said organic group comprises at least one, preferably 1 to 3 polar functional group, or salts thereof.

In such polyorganosiloxane b) the polar functional groups are preferably selected from the group consisting of: ether, polyether, sulfido, epoxy, polyetherester, amide, amine N-oxide, sulfate, quaternary ammonium, zwitter ionic, sulfonate, carboxyl, acid anhydride, phosphonate, phosphate, hydroxyl and sulfosuccinate groups.

Most preferred are compositions with polyorganosiloxanes b) with at least one polar functional group on Si—C bonded hydrocarbon radicals selected from the groups consisting of: amino, epoxy, amide, carboxy, quaternary ammonium and zwitter ionic groups.

Most especially preferred are compositions with polyorganosiloxanes b) with one or more polar carboxy, amide and/or quaternary ammonium functional groups, or combinations of such polyorganosiloxanes.

Also preferred are compositions for the treatment of fibrous materials comprising in addition to a), the polyorganosiloxanes with 1,3-dihydroxyalkyl functional groups and b), the polyorganosiloxanes with polar functional groups, also c), an organic silicone-free compound, e.g. a synthetic or natural organic compound, with at least one carboxy group or an organic polymer with at least one carboxy group, each free of silicon (i.e. different from a) and b)) or salts thereof, and optionally d) a surfactant different from any of the components a) to c). The preferred compositions may also comprise optionally e) hydrophobic oils and waxes, again each different from component a) to d).

Component b) is any polyorganosiloxane with one or more polar groups, i.e. heteroatom-containing groups, bound to the polymer backbone via Si—C-bonded hydrocarbon radicals, wherein the functional groups are selected from the group consisting of: ether, sulfido, epoxy, polyetherester, amide, amine N-oxide, sulfate, quaternary ammonium, zwitter ionic, sulfonate, carboxy, phosphonate, phosphate, hydroxyl or sulfosuccinate groups.

Component b) is preferably a polyorganosiloxane with one or more polar functional groups on Si—C-bonded hydrocarbon radicals, wherein said polar functional groups consist of one or more quaternary ammonium functional groups.

Especially preferred are also polyorganosiloxanes with pendant and/or terminal quaternary ammonium functional groups.

The Si—C-bonded hydrocarbon radicals with quaternary ammonium functional groups in component b) preferable include organic groups with up to 40 carbon atoms, containing at least one quaternary ammonium group and optionally containing one or more heteroatoms selected from N, S, O and P.

In a preferred embodiment polyorganosiloxane b) is of the general formula:

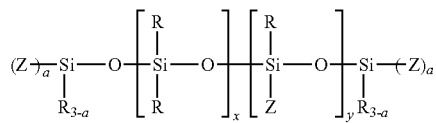

wherein a is 0 to 3,
x is 1 to 1000, preferably 10 to 1000
y is 0 to 100,
x+y is 1 to 1100
a+y is ≥1,
Z is an organic radical with up to 60 carbon atoms comprising at least one polar group preferably selected from
  an ether group,
  a polyether group,
  a sulfido group,
  an epoxy group,
  a polyetherester group,
  an amine group,
  an amide group,
  a carboxy amide group,
  an amine N-oxide group,
  a sulfate group,
  a quaternary ammonium group,
  a zwitter ionic group,
  a sulfonate group,
  a carboxyl group,
  an acid anhydride group,
  a phosphonate group,
  a phosphate group,
  a hydroxyl group,
  a sulfosuccinate group.
and which organic radical is bonded via a carbon atom to the silicon atom, and R is an organic group having up to 25 carbon atoms, preferably methyl.

Preferred are polyorganosiloxanes b) comprising a quaternary ammonium group and/or a carboxyl group, or salts thereof with suitable anions or cations.

Especially preferred are polyorganosiloxanes b) with quaternary ammonium functional groups of the formula:

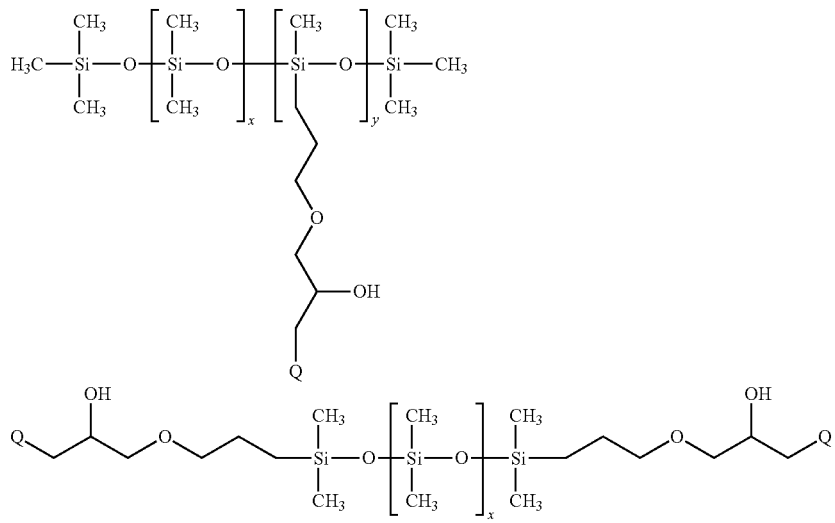

and Q=
quaternary ammonium group containing organic group with up to 60 carbon atoms, such as:

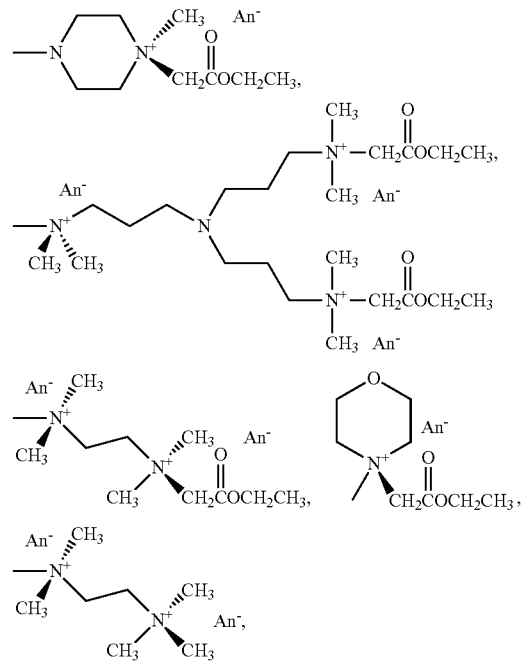

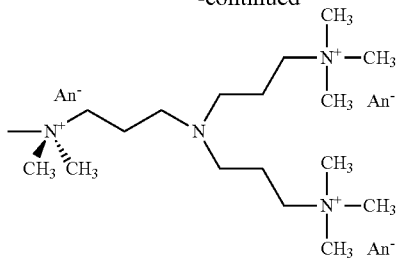

wherein An⁻ is a organic or inorganic anion, like a carboxylate anion, halogen anion, preferably Cl⁻, Br⁻, sulfate anion, sulfonate anion, phosphate, nitrate, perchlorate, and x and y are as defined above.

Also preferred are polyorganosiloxanes b) with polar functional groups, wherein the functional groups are amide, carboxy or sulfosuccinate groups, including by reference the functional polyorganosiloxanes cited in U.S. Pat. No. 7,250, 456 (pg. 2, line 56 to pg. 3, line 55), EP1108765 (pg. 4, line 38 to pg. 23, line 56), WO1998021369 (pg. 7, line 18 to pg. 9, line 25), EP 745141 (pg. 2, line 24 to pg. 3, line 43), EP0095676 and EP638128 (pg. 3, line 11 to line 33).

Especially preferred are polyorganosiloxanes b) with carboxy and/or amide functional groups of the general formula:

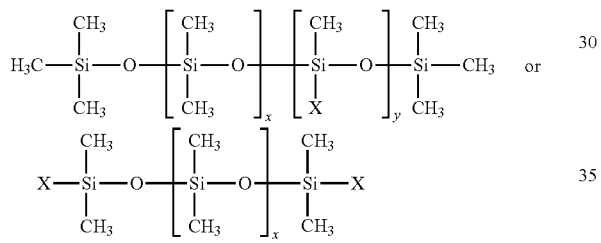

wherein x and y are as defined above, and X is a carboxy and/or carboxy amide group containing organic group with up to 60 carbon atoms bond to a silicon atom via a Si—C— bond, such as:
organic groups containing at least one group of the formulas:

—(CH$_2$)$_p$—O-E,

—NH-E,

—NH(CH$_2$)$_q$—NH-E,

—N(E)(CH$_2$)$_q$—NH-E,

—O—CH$_2$—CH(OH)—CH$_2$—NH—(CH$_2$)$_q$—NH-E,

—O—CH$_2$—CH(OH)—CH$_2$—N(E)-(CH$_2$)$_q$—NH-E,

—O—CH$_2$—CH(OH)—CH$_2$—NH(CH$_2$CH$_2$—O-E),

—O—CH$_2$—CH(OH)—CH$_2$—N(CH$_2$CH$_2$—O—P)$_2$,

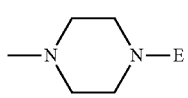 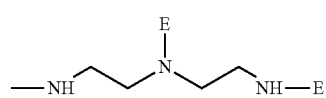

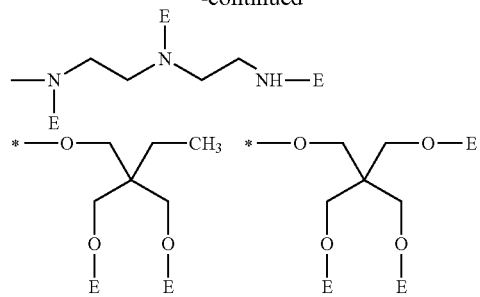

or the like, wherein
E is independently selected from groups such as:

—C(O)CH$_2$CH$_2$C(O)OH,

—C(O)CH═CHC(O)OH,

—C(O)CH(R$^2$)CH$_2$C(O)OH,

—C(O)(CH$_2$)$_n$OC(O)CH$_2$CH$_2$C(O)OH,

—C(O)(CH$_2$)$_n$OC(O)CH═CHC(O)OH,

—C(O)(CH$_2$)$_n$OC(O)CH(R$^2$)CH$_2$C(O)OH, wherein R$^2$ is a saturated or unsaturated organic group with up to 25 carbon atoms and n=as defined above, preferably 2-12,
or E is

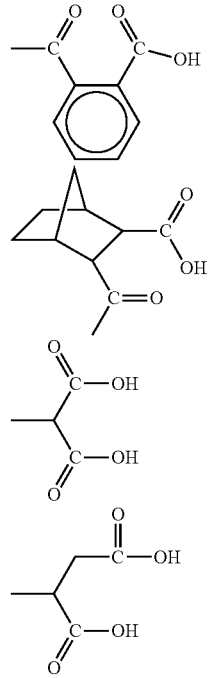

and the like.

Especially preferred are combinations of polyorganosiloxanes a) with polyhydroxy functional groups with one or more polyorganosiloxanes b) with quaternary ammonium, carboxy or carboxy amide functional groups.

The inventive polyorganosiloxanes a) and b) may also have additional groups bonded to the polymer backbone by either Si—O—C or Si—C linkages taken from the group consisting of alkyl, aryl, alkoxy, alkylaryl, alkylphenolic or carbinol. Especially preferred are also waterproofing agents that comprise both polyorganosiloxanes b) with at least one Si—C bonded quaternary ammonium group and polyorganosiloxane polymers b) with at least one Si—C bonded carboxy and/or amide group.

Component c) is an organic silicon-free compound having at least one carboxy group such as a synthetic or natural organic compound with at least one carboxy group or an organic polymer with at least one carboxy group or a salt thereof. Suitable salts include for example alkaline (sodium, potassium) or alkaline-earth salts (calcium) or ammonium salts.

Preferred are natural fatty acids derived from tallow, palm oil, fish oils, or seed oils and their mixtures.

Especially preferred are fatty acids and hydrogenated fatty acids such as oleic acid, linoleic acid, ricinoleic acid, lauric acid, myristic acid, palmitic acid, stearic acid and their mixtures.

Also preferred are synthetic carboxy-functional molecules such as those derived from paraffins and the like, such as oxidized paraffins. Also preferred are polyacrylates that contain at least one acrylic acid group per molecule. Included by reference are the copolymers cited in EP 372746 (pg. 4 line 52 to page. 6 line 40) and EP 757108 (pg. 2 line 19 to page. 3 line 44). Included by reference are also the polycarboxylic acids and carboxy polymers cited in U.S. Pat. No. 7,250,456 (page. 5, line 1 to page. 10, line 16). Furthermore are included alkylacylamidocarboxylic acids, alkylether carboxylic acids.

Component c) does not include zwitter ionic molecules, which shall belong to the class of surfactants d) as defined below.

Optional component d) is any of a number of polar surfactants different from component a) to c) (i.e. component d) is no polysiloxane, does not have a carboxylic acid group or a salt thereof, except for zwitter ionic compounds). Preferred are those polar surfactants selected from the group of amino acids, amino sulfonic acids, commonly known as sarcosines and taurides, quaternary amido carboxylates and sulfates, sulfosuccinates, and, including by reference the surfactants cited in U.S. Pat. No. 2,964,425 (pg. 3, lines 11-32), U.S. Pat. No. 7,250,456 (pg. 3, line 56 through pg. 5, line 2), EP 1108765 (pg. 25, lines 8-22) and WO 98/021369 (pg 21, lines 17-29). Preferred are component d) with the general formula:

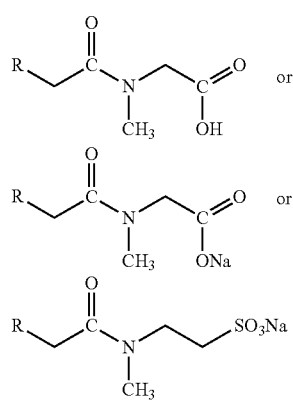

or other substituted taurins, or

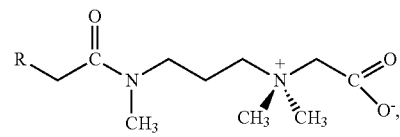

wherein R is as defined above.

Especially preferred are sarcosines such as N-oleylsarcosine, N-stearylsarcosine and N-lauroylsarcosine and N-isononanoylsarcosine and their respective salts. Also preferred are taurides such as oleic acid methyl tauride and its salts. Also preferred are betaines such as cocoalkylamidopropylbetaine, N-lauryldimethylbetaine, cocoalkylamidopropylsulfobetaine, 3-(dodecyldimethylamonio)propansulfonate and their salts.

Optionally the inventive waterproofing compositions may include hydrophobic oils or waxes e), whereby said oils and waxes can be any natural or synthetic oils and waxes such as mineral oils, white oils, alkyl esters of fatty acids or hydrogenated fatty acids, vegetable or animal oils, including fish oils, paraffin waxes, oxidized paraffins or chloroparaffins, and included by reference those oils and waxes cited in U.S. Pat. No. 7,250,456 (pg. 2, line 44-55), EP 1108765 (pg. 25, lines 3-7) and WO 98/021369 (pg. 19, lines 7-15). Also included in the inventive oils and waxes are hydrophobic non-polar polyorganosiloxanes such as polydimethylsiloxanes. Alternatively, the optional oils and waxes can be added to the waterproofing liquor as separate aqueous emulsions.

Optionally the inventive waterproofing compositions may include other auxiliaries f), like organic solvents such as glycols, glycolethers or alcohols, such as hexyleneglycol, butylglycol, 1,2-propandiol, 1,2-ethandiol, 1-butanol, 2-ethylhexanol and the like, pH-adjusting agents (acids, bases), buffers, preservatives, biocides, perfumes, dies, pigments, thickeners or fillers.

The polyorganosiloxane a) is used preferably in an aqueous composition, preferably in aqueous emulsions, comprising for example 0, 1 to 60 weight-% of the polyorganosiloxane a).

The inventive waterproofing compositions thus may be preferably formulated with water and appropriate pH adjusting agents to aqueous compositions, preferably aqueous emulsions. Preferred are aqueous compositions, including emulsions, containing 3 and 70 wt-%, preferably 5 to 60, more preferably 10 and 50% of the inventive components a)-e) the remainder being water and optionally organic solvents. Especially preferred are aqueous emulsions with between 3 and 50% of the inventive components a) and b). Most especially preferred are emulsions with between 5 and 40% of the components a) and b).

The preferred waterproofing emulsions have a pH value of greater than 7. Especially preferred is a pH of 8-11. Appropriate pH adjusting agents are any typical water-soluble acid or base. Preferred is the use of bases such as sodium or potassium hydroxide, sodium carbonate, sodium formate, sodium acetate, and ammonia or a primary, secondary or tertiary amine or alcohol amine such as trimethylamine, triethylamine, morpholine, pyridine, triethanolamine, diethanolamine, or ethanolamine. Included by reference are the bases cited in WO 1998/021369 (page 18, line 23 through page 19, line 2) and EP 324345 (page 2, line 15 to 32).

Especially preferred are waterproofing emulsions with a pH of greater than 7 comprising as base sodium hydroxide, triethylamine, diethanolamine, triethanolamine or morpholine.

A particularly preferred composition comprises:
- 10-90 (preferable 20-80) parts per weight of at least one polyorganosiloxane a) as defined above,
- 1-50 (preferable 5-40) parts per weight at least one polyorganosiloxane b) as defined above,
- 0-60 (preferable 10-50) parts per weight organic silicon-free compound c) as defined above
- 0-40 (preferable 1-30) parts per weight surfactant component d) as defined above,
- 0-40 (preferable 0-30) hydrophobic oils or waxes e),
- 0-20 (preferable 1-10) auxiliaries f),
- and 50-4000 parts water per 100 parts of the total of the components a) to f).

The resulting solid contents (components a) to f)) of the aqueous compositions according to the invention is preferably in the range of 10 to 70%, preferably 15 to 60 by weight based on the total composition.

The inventive waterproofing emulsions can be prepared according to the state-of-the-art by mixing the components with water and pH adjusting agents using moderate to high shear and then if desired diluting with more water and adjusting the pH with acids or bases. Common biocides can be added as storage preservatives.

A particular advantage of the inventive waterproofing emulsions is that they can be formulated to highly stable emulsions that are stable to both heat and freezing and dilution to a pH between 4 and 7. In particular waterproofing emulsions comprising the component b) can be formulated as microemulsions with a volume average $d_{50}$ size of less than 120 nm, preferably less than 100 nm, measured by laser scattering method preferably performed by using a Beckman Coulter Particle Sizer Model LS 13320 preferably according to the Mie-Theory of light scattering applying the method ISO 13320-1 (1990): Particle size analysis-Laser diffraction methods. See also I. Zimmermann Ingenieur Technik 68 (1996) Nr. 4.

Preferred are waterproofing microemulsions comprising component b) selected from the group of polyorganosiloxanes with one or more polar carboxy, carboxy amide or quaternary ammonium functional groups, or combinations of such polyorganosiloxanes. Especially preferred are microemulsions that comprise between 2 and 30% of the selected component b) with one or more polar carboxy, amide or quaternary ammonium functional groups, or combinations of such polyorganosiloxanes.

The inventive waterproofing compositions are suited for the hydrophobic treatment of fibrous materials, in particular those materials composed of at least in part of natural fibers. The inventive compositions and emulsions can be used to treat textiles and fabrics to make them water repellant. The hydrophobic treatment can occur before, during or after dyeing the textile or fabric.

The inventive compositions and emulsions are particularly suited for the hydrophobic treatment of leather, furs and leather substitutes. The hydrophobic treatment can occur in one or more steps before, during or after retanning and fatliquoring. Included by reference are the methods described in WO 1998/021369 (page 20, line 21 through page 21, line 12), EP1108705 (pg. 39, line 15 to pg. 41, line 13), EP 1087021 (pg. 8, line 46 to pg. 9, line 58) and WO2003/064707 (pg. 16-17).

Preferred embodiments of the invention comprise the following:

A use of a polyorganosiloxane a) or a composition comprising the same of the invention, wherein the fibrous substrate to be treated is selected from leather, furs or leather substitutes.

A use of a polyorganosiloxane a) or a composition comprising the same in the hydrophobic treatment of the fibrous substrate.

A use of a polyorganosiloxane a) or a composition comprising the same, wherein the polyorganosiloxane a) is selected from polyorganosiloxanes having pendant and/or terminal 1,3-dihydroxy alkyl moieties.

A use of a polyorganosiloxane a) or a composition comprising the same, wherein the polyorganosiloxane a) is selected from polyorganosiloxanes having terminal 1,3-dihydroxy alkyl moieties.

A use of a polyorganosiloxane a) or a composition comprising the same, wherein 1,3-dihydroxy alkyl moieties are bound to a silicon atom of the polyorganosiloxane moiety via a carbon atom.

A use of a polyorganosiloxane a) or a composition comprising the same, wherein the polyorganosiloxane a) has a 1,3-dihydroxy alkyl moiety of the formula:

wherein A is a di- or trivalent organic residue having up to 30 carbon atoms bound to a silicon atom of the polyorganosiloxane moiety via a carbon atom, B is an optionally substituted 1,3-dihydroxypropanyl moiety bound to the group A and v=1 or 2.

A use of a polyorganosiloxane a) or a composition comprising the same, wherein the polyorganosiloxane a) has the formula:

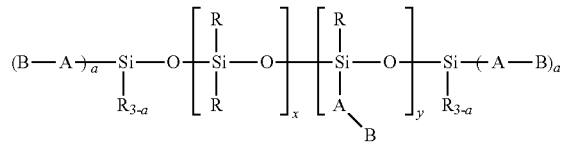

wherein a is 0 to 3, x is 0 to 1100, preferably 10 to 1000, y is 0 to 100, x+y is 0 to 1000, preferably 10 to 1100, a+y is ≥1, A and B are as defined above, R is an organic group having up to 25 carbon atoms.

A use of a polyorganosiloxane a) or a composition comprising the same, wherein the polyorganosiloxane a) has the formula:

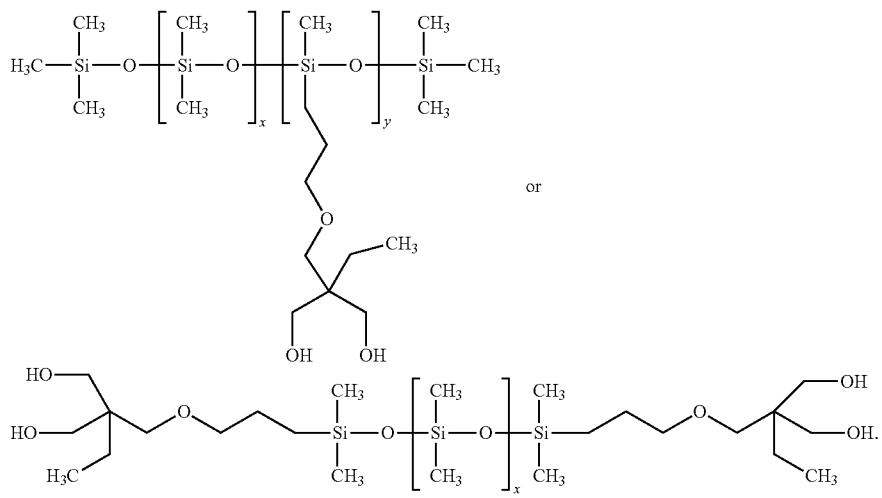

wherein x and y are as defined above.

A further preferred embodiment relates to a composition of the invention comprising:
a) at least one polyorganosiloxane a) as defined above,
b) at least one polyorganosiloxane b)—different from polyorganosiloxane a)—having one or more organic groups bound to the polyorganosiloxane backbone via an Si—C-bond, said organic group comprises at least one polar functional group, or salts thereof.

In a further preferred embodiment of the invention the functional groups in the polyorganosiloxane b) are preferably selected from the group consisting of
an ether group,
a polyether group,
a sulfido group,
an epoxy group,
a polyetherester group,
an amine group,
an amide group,
a carboxy amide group,
an amine N-oxide group,
a sulfate group,
a quaternary ammonium group,
a zwitter ionic group,
a sulfonate group,
a carboxyl group,
an acid anhydride group,
a phosphonate group,
a phosphate group,
a hydroxyl group,
a sulfosuccinate group.

In a further preferred embodiment the composition of the invention comprises preferably:
per 100 parts by weight of the component a),
1 to 200 parts by weight of the component b).

In a further preferred embodiment the composition of the invention comprises component c), an organic silicon-free compound having at least one carboxy group or a salt thereof.

In a further preferred embodiment the composition of the invention comprises component d), at least one surfactant, different from component a) to c).

In a further preferred embodiment the composition of the invention is an aqueous composition, preferably an aqueous emulsion. Such aqueous compositions, in particular, aqueous emulsions are preferably applied before, during or after tanning of the leather. Preferably the aqueous compositions are applied to wet leathers obtained after the aqueous tanning process.

In a further preferred embodiment the aqueous compositions of the invention comprises 40 to 97% by weight water.

In a further preferred embodiment the aqueous compositions of the invention has a pH value at 20° C. of more than 7.

In a further preferred embodiment the composition of the invention comprises 3 to 60% by weight of the components a) and b).

In a further preferred embodiment the composition of the invention is an aqueous emulsion having a pH value at 20° C. of more than 7 comprising 40 to 97% by weight water.

In a further preferred embodiment the polyorganosiloxane a) or a composition comprising the same according to the invention is for use for the treatment of fibrous substrates to make them hydrophobic.

In a further preferred embodiment the invention relates to a process for the treatment of fibrous substrates, which comprises the contacting of the composition of the invention with fibrous substrates.

In a further preferred embodiment the invention relates to a process for the treatment of fibrous substrates, wherein the fibrous substrate is selected from tanned, dried leather, and the composition according to the invention as defined above comprises a volatile organic solvent, which process further comprises the step of drying the leather to remove the volatile organic solvent.

In particular, this embodiment of the invention relates to the treatment of tanned, dried leather, after completion of the water-based tanning and fatliquoring processes and drying, with a composition according to the invention comprising one or more of the above defined polyorganosiloxanes a) and preferably one or more polyorganosiloxanes b) in at least one volatile organic solvent, having preferably a boiling point of less than 250° C., preferably less than 100° C. In particular, preferably vegetative or synthetic (preferably without use of chromium salts) tanned leathers such as described in EP1702991 (page 2, lines 11-14) and WO1996/15276 (page 3, lines 18-39) are treated with a composition according to the invention as defined above after tanning and drying. Vegetative tanned leather is commonly used in shoe sole leather and similar articles where a very dense and stiff leather is required. Vegetative tanning in general is carried out in an aqueous bath of natural or synthetic organic tanning agents at a pH of 4 or below. At this pH the aqueous polyorganosiloxane emulsions are less stable, making them less preferred for those already tanned dried leathers. In a preferred embodiment the invention relates to a process for the treatment of tanned, dried leathers, which process involves the step of contacting the leather with a solution of one or more polyorganosiloxanes a) as defined above, and/or one or more polyorganosiloxanes b) in a volatile organic solvent. After this step the treated leather is then dried to remove the organic solvent. Preferred in this embodiment are solutions that contain 10 to 60% per weight of the said polysiloxanes, based on the total weight of the composition. Especially preferred are solutions that contain 30 to 40% per weight of the said polysiloxanes, based on the total weight of the composition. Preferred is contacting the leather with the polysiloxane solution by immersion for between 30 minutes and 24 hours at ambient temperature (25° C.). The leather can also be treated at temperatures above ambient but below the boiling point of the organic solvent. Preferred is also repeated treatment by further immersion after drying. The preferred organic solvents are volatile at temperatures of below 100° C. Examples of the preferred organic solvents are aliphatic or aromatic hydrocarbons, alcohols, polyalcohols, ethers, polyethers, ketones and esters, such as Isopar G or Exxsol D100 (sold by ExxonMobil Chemicals), isopropanol, isobutanol, 1,3-butandiol, 1-pentanol, 2-ethylhexanol, 1-decanol, 2-butanone, and ethyl acetate. Especially preferred are organic alcohols such as isopropanol, isobutanol, 1,3-butandiol, 1-pentanol, 2-ethylhexanol, and 1-decanol.

Preferred is the treatment of tanned, dried leather with solutions comprising at least one polyorganosiloxane a). Also preferred is the treatment with solutions comprising at least one polyorganosiloxane b) having one or more organic groups bound to the polyorganosiloxane backbone via an Si—C-bond, said organic group comprising at least one polar functional group, wherein the functional group is an amino or a quaternary ammonium group. Especially preferred in the treatment of tanned, dried leather with polyorganosiloxanes b) with the general structure wherein Q is a quaternary ammonium or an amino functional organic group and x and y is as defined above. Most especially preferred are polyorganosiloxanes b) wherein Q is a group with the general structure

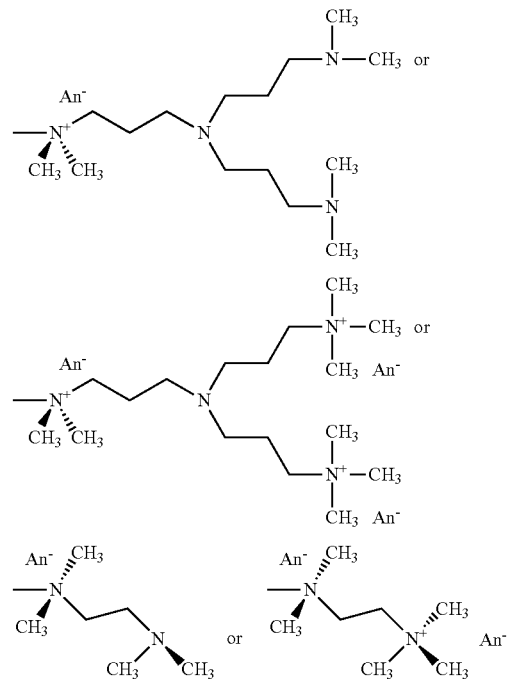

wherein An⁻ is a organic or inorganic anion.

In a further preferred embodiment the invention relates to a fibrous product treated with the composition of the invention, which contains preferably 0.2 to 20% by weight silicon per 100% by weight of the fibrous product.

In a further preferred embodiment the invention relates to a fibrous product, which is a leather product that is treated before, after or during retaining and dyeing of leather with the composition of the invention.

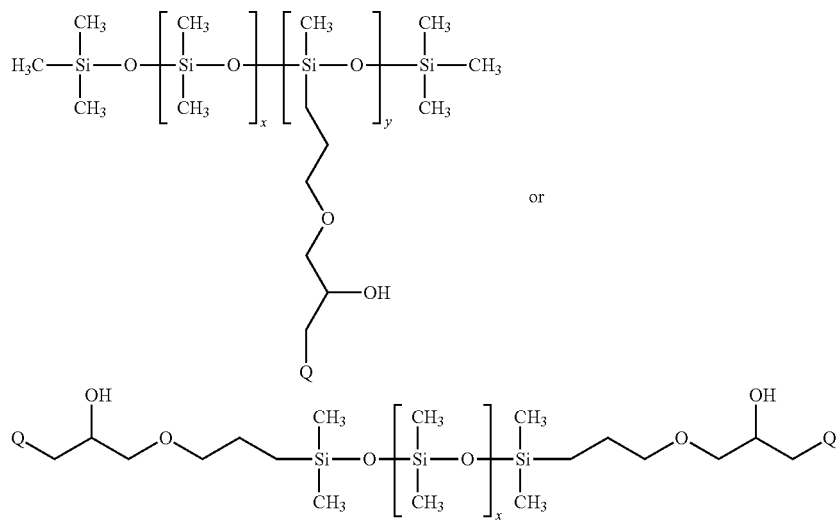

EXAMPLES

Test methods: Dynamic water resistance according to Maeser, method ASTM D 2099-70 or ISO/DIN 5403-2.

Static water absorption after immersion for 4 hours according to ASTM D1815 or ISO 2417:2002

Water vapour permeability according to ASTM D5052 or ISO 14268:2002.

Materials:

Dihydroxy-functional Siloxan a1)

A polydimethylsiloxane with terminal 1,3-dihydroxy functional groups with a number average molecular wt. of 10.000 g/mol and on average 0.4 mmol/g of hydroxy groups, a viscosity of 550 mPa*s at 23° C. and a refractive index of 1.408 at 20° C. of the formula:

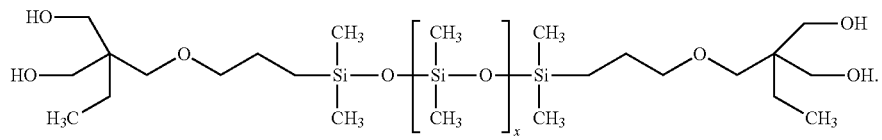

Dihydroxy-Functional Siloxan a2) (Comparison)

A polydimethylsiloxane with terminal 1,2-dihydroxy functional groups with an average molecular wt. of 10.000 g/mol and on average 0.4 mmol/g of hydroxy groups, a viscosity of 873 mPa*s at 23° C. and a refractive index of 1.407 at 20° C.

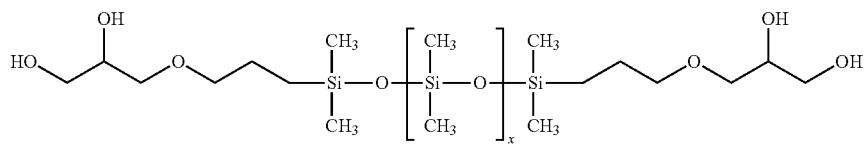

Quaternary-Ammonium-Functional Siloxan b1)

A polydimethylsiloxane with terminal quaternary ammonium functional groups of the general structure

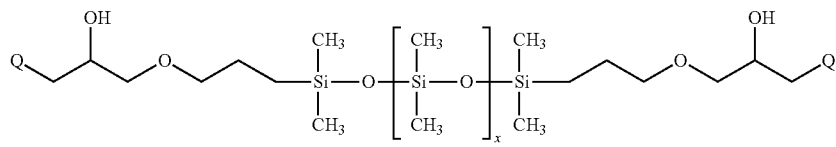

where Q=

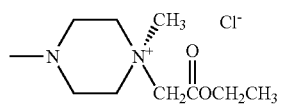

with an average molecular weight of 3800 g/mol and on average 0.49 mmol/g quaternary ammonium groups.

Carboxy-Functional Siloxan b2)

A polydimethylsiloxane with pendant carboxy functional groups with an average molecular weight of 30000 g/mol and on average 0.375 mmol/g Si—C-bonded hydrocarbon radicals that contain on average two carboxy amide groups.

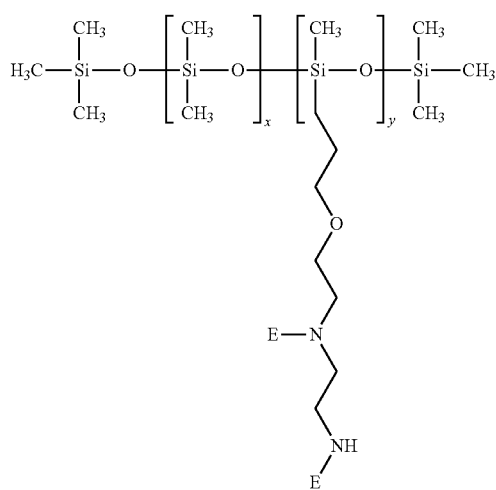

where x=300 and y=10 and E has the formula —C(O)CH2CH2C(O)OH, and —C(O)(CH2)5OC(O)CH2CH2C(O)OH.

Example 1

69 parts of the dihydroxy-functional polyorganosiloxane a1) were thoroughly mixed with 19.5 parts of oleic acid (component c) and 11.5 parts of oleoylsarcosine (commerically available as Crodasinic O from Croda GmbH—component d)). This mixture was then combined with 245 parts of deionized water and 5 parts of a 40% solution of sodium hydroxide (component f) in water using moderate shear to obtain a homogeneous emulsion. The final emulsion had a solids content of 28.8%, a viscosity of 43 mPa*s at 23° C., a pH value of 7.5 and an average particle size of 0.77 microns. The emulsion was stable to 1:50 dilution in a pH 5.5 aqueous buffer solution. The emulsion was found to be effective in the hydrophobation of leather.

Example 2

54 parts of the dihydroxy-functional polyorganosiloxane a1), 15 parts of the quaternary-ammonium-functional siloxane b1) were thoroughly mixed with 19.5 parts of oleic acid (component c)) and 11.5 parts of oleoylsarcosine (component d)). This mixture was then combined with deionized water and 9 parts of a 40% solution of sodium hydroxide (component f)) in water using moderate shear to obtain a homogeneous emulsion. The final emulsion had a solids content of 35.9%, a viscosity of 485 mPa*s at 23° C., a pH value of 9 and an average particle size of less than 0.1 microns. The emulsion was stable to 1:50 dilution in a pH 5.5 aqueous buffer solution. The emulsion was stable to storage at 50° C. for in excess of 9 weeks. The emulsion could be subjected to freezing at −8° C., remaining a stable emulsion upon thawing. The emulsion was found to yield a highly durable hydrophobation of leather.

Example 3

30.5 parts of the dihydroxy-functional siloxane a1) and 30.5 parts of the quaternary-ammonium-functional siloxane b1) were thoroughly mixed with 34 parts of oleic acid (component c)) and 5.0 parts of oleoylsarcosine (component d)). This mixture was then combined with deionized water and 14 parts of a 40% solution of sodium hydroxide (component f)) in water using moderate shear to obtain a homogeneous emulsion. The final emulsion had a solids content of 31.1%, a viscosity of 117 mPa*s at 23° C. and a pH value of 9. The product was a clear microemulsion with a particle size of less than 0.1 microns. The emulsion was stable to 1:50 dilution in a pH 5.5 aqueous buffer solution. The microemulsion was stable to storage at 50° C. for in excess of 9 weeks. The emulsion could be subjected to freezing at −8° C., remaining a stable emulsion upon thawing. The emulsion was found to yield a highly durable hydrophobation of leather.

Example 4

28 parts of the dihydroxy-functional siloxane a1) and 28 parts of a carboxy-functional siloxane b2) were thoroughly mixed with 31 parts of oleic acid (component c)) and 13 parts of oleoylsarcosine (component d)). This mixture was then combined with deionized water and 14 parts of a 40% solution of sodium hydroxide (component f)) in water using moderate shear to obtain a homogeneous emulsion. The final emulsion had a solids content of 33.7%, a viscosity of 28 mPa*s at 23° C. and a pH value of 11. The emulsion was stable to 1:50 dilution in a pH 5.5 aqueous buffer solution. The emulsion was found to be particularly effective in the hydrophobation of leather.

Example 5

19 parts of the dihydroxy-functional siloxane a1) and 17 parts of the quaternary-ammonium-functional siloxane b1) and 29 parts of a carboxy-functional siloxane b2) were thoroughly mixed with 29 parts of oleic acid (component c)) and 6 parts of oleoylsarcosine (component d)). This mixture was then combined with deionized water and 16 parts of a 40% solution of sodium hydroxide (component f)) in water using moderate shear to obtain a homogeneous emulsion. The final emulsion had a solids content of 31.0%, a viscosity of 11 mPa*s at 23° C. and a pH value of 11. The emulsion was stable to 1:50 dilution in a pH 5.5 aqueous buffer solution. The emulsion was found to yield a highly durable hydrophobation of leather.

Example 6

53 parts of the dihydroxy-functional siloxane a1), 6.5 parts of the quaternary-ammonium-functional siloxane b1) were thoroughly mixed with 33 parts of oleic acid (component c) and 7.5 parts of oleoylmethyltauride (commerically available as Arkonpon T8015 from Clariant GmbH—(component d)). This mixture was then combined with deionized water and 11 parts of a 40% solution of sodium hydroxide (component f)) in water using moderate shear to obtain a homogeneous emulsion. The final emulsion had a solids content of 36.8%, a viscosity of 11 mPa*s at 23° C., a pH value of 9.5 and an average particle size of 1.15 microns. The emulsion was stable to 1:50 dilution in a pH 5.5 aqueous buffer solution. The emulsion was found to be particularly effective in the hydrophobation of leather.

Comparative Example 1

31 parts of the dihydroxy-functional siloxane a2), with 1,2-dihydroxy functional groups, and 31 parts of the quaternary-ammonium-functional siloxane b1) were thoroughly mixed with 33 parts of oleic acid (component c)) and 5 parts of oleoylsarcosine (component d)). This mixture was then combined with deionized water and 13.5 parts of a 40% solution of sodium hydroxide (component f)) in water using moderate shear to obtain a homogeneous emulsion. The final emulsion had a solids content of 31.1%, a viscosity of 15 mPa*s at 23° C. and a pH value of 9. The emulsion was stable to 1:50 dilution in a pH 5.5 aqueous buffer solution, but failed to yield leather with a durable hydrophobation.

The invention claimed is:

1. A process of treating a fibrous substrate comprising applying a polyorganosiloxane a) including at least one 1,3-dihydroxy alkyl moiety and at least one polyorganosiloxane b)—different from polyorganosiloxane a)—wherein polyorganosiloxane b) includes at least one organic group bound to a polyorganosiloxane backbone via an Si—C-bond, said at least one organic group comprising at least one polar functional group;

or salts of polyorganosiloxane b).

2. The process of claim 1, wherein the fibrous substrate is selected from the group consisting of leather, furs and leather substitutes.

3. The process of claim 1, wherein treating the fibrous substrate includes hydrophobic treatment.

4. The process of claim 1, wherein the polyorganosiloxane a) is selected from polyorganosiloxanes having pendant and/or terminal 1,3-dihydroxy alkyl moieties.

5. The process of claim 1, wherein 1,3-dihydroxy alkyl moieties are bound to a silicon atom of the polyorganosiloxane moiety via a carbon atom.

6. The process of claim 1, wherein the polyorganosiloxane a) has a 1,3-dihydroxy alkyl moiety of the formula:

-A-(B)$_v$, wherein A is a di- or trivalent organic residue having up to 30 carbon atoms bound to a silicon atom of the polyorganosiloxane moiety via a carbon atom, B is an optionally substituted 1,3-dihydroxypropanyl moiety bound to the group A and v=1 or 2.

7. The process of claim 1, wherein the polyorganosiloxane a) has the formula:

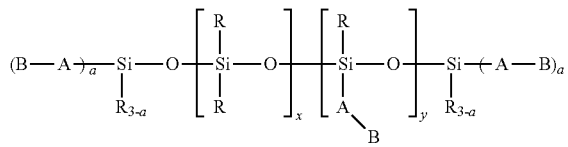

wherein a is 0 to 3,
x is 0 to 1100,
y is 0 to 100,
x+y is 0 to 1000,
a+y is ≥1,
wherein A is a di- or trivalent organic residue having up to 30 carbon atoms bound to a silicon atom of the polyorganosiloxane moiety via a carbon atom, B is an optionally substituted 1,3-dihydroxypropanyl moiety bound to the group A, and
R is an organic group having up to 25 carbon atoms.

8. The process of claim 1, wherein the polyorganosiloxane a) has the formula:

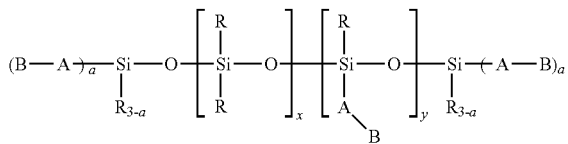

wherein a is 0 to 3,
x is 10 to 1000,
y is 0 to 100,
x+y is 10 to 1100,
a+y is ≥1,
wherein A is a di- or trivalent organic residue having up to 30 carbon atoms bound to a silicon atom of the polyorganosiloxane moiety via a carbon atom, B is an optionally substituted 1,3-dihydroxypropanyl moiety bound to the group A, and
R is an organic group having up to 25 carbon atoms.

9. The process of claim 1, wherein the polyorganosiloxane a) has the formula:

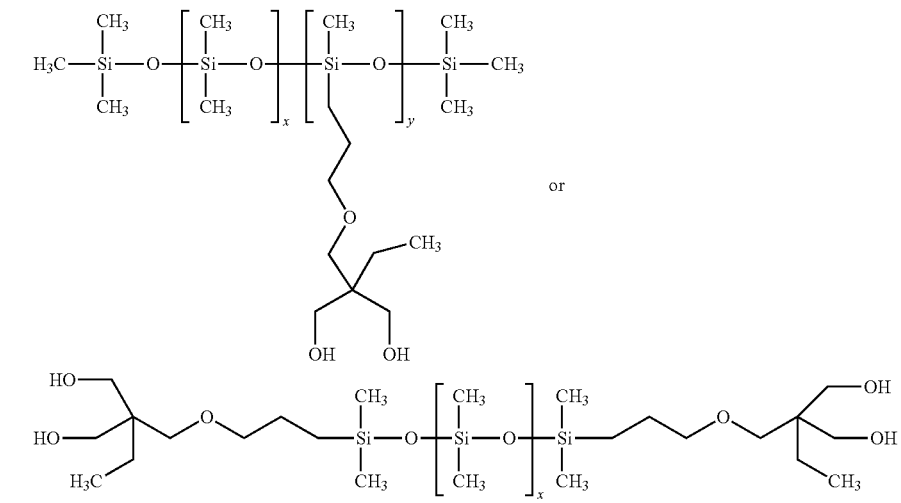

wherein
x is 10 to 1000, and
y is 0 to 100.

10. The process of claim 1, wherein the polyorganosiloxane a) is used in a composition comprising at least one solvent, selected from the group consisting of water and organic solvents.

11. The process of claim 1, wherein 1-200 parts by weight of polyorganosiloxane b) is present per 100 parts by weight of polyorganosiloxane a).

12. The process of claim 1, wherein the composition further comprises at least one component selected from
component c), an organic silicon-free compound having at least one carboxy group or a salt thereof, and
component d), at least one surfactant, different from component a) to c).

13. The process of claim 1, wherein polyorganosiloxanes a) and b) are present in the form of an aqueous emulsion.

14. The process of claim 1, wherein polyorganosiloxanes a) and b) are provided in a solution together with at least one organic solvent.

15. The process of claim 1, wherein the fibrous substrate is selected from tanned leather and dried leather, and the polyorganosiloxane a) is provided in a solution together with at least one organic solvent, wherein the process further comprises the step of drying the leather to remove the volatile organic solvent.

16. The process of claim 1, wherein the fibrous substrate is selected from tanned, leather and dried leather, and the polyorganosiloxane a) and polyorganosiloxane b) are provided in a solution together with at least one organic solvent, wherein the process further comprises the step of drying the leather to remove the volatile organic solvent.

17. A fibrous product treated according to the process of claim 1.

18. A fibrous product treated according to the process of claim 7.

19. A fibrous product treated according to the process of claim 8.

20. A fibrous product treated according to the process of claim 9.

* * * * *